(12) United States Patent
Nakamoto

(10) Patent No.: US 6,891,320 B2
(45) Date of Patent: May 10, 2005

(54) FIELD EMISSION COLD CATHODE DEVICE OF LATERAL TYPE

(75) Inventor: Masayuki Nakamoto, Chigasaki (JP)

(73) Assignee: Kabushiki Kaisha Toshiba, Tokyo (JP)

(*) Notice: Subject to any disclaimer, the term of this patent is extended or adjusted under 35 U.S.C. 154(b) by 430 days.

(21) Appl. No.: 09/987,862

(22) Filed: Nov. 16, 2001

(65) Prior Publication Data

US 2002/0060514 A1 May 23, 2002

(30) Foreign Application Priority Data

Nov. 17, 2000 (JP) .................................. 2000-351610

(51) Int. Cl.$^7$ .............................................. H01J 1/05
(52) U.S. Cl. ...................... 313/311; 313/497; 313/495
(58) Field of Search .............................. 313/309, 310, 313/311, 351, 336, 422, 495, 496, 497; 315/169.3; 445/50, 51, 24

(56) References Cited

U.S. PATENT DOCUMENTS

| | | | |
|---|---|---|---|
| 5,499,938 A | | 3/1996 | Nakamoto et al. |
| 5,614,795 A | * | 3/1997 | Kim ........................... 313/336 |
| 5,727,976 A | | 3/1998 | Nakamoto et al. |
| 5,747,926 A | | 5/1998 | Nakamoto et al. |
| 5,749,762 A | | 5/1998 | Nakamoto et al. |
| 5,786,656 A | | 7/1998 | Hasegawa et al. |
| 5,793,153 A | * | 8/1998 | Itoh et al. ..................... 313/306 |
| 5,808,408 A | | 9/1998 | Nakamoto |
| 5,834,324 A | | 11/1998 | Nakamoto |
| 5,977,693 A | | 11/1999 | Nakamoto et al. |
| 6,031,328 A | | 2/2000 | Nakamoto |
| 6,097,138 A | | 8/2000 | Nakamoto |
| 6,605,894 B2 | * | 8/2003 | Choi et al. .................... 313/495 |
| 2002/0060516 A1 | * | 5/2002 | Kawate et al. ................ 313/495 |
| 2003/0122467 A1 | * | 7/2003 | Cho et al. .................... 313/309 |

FOREIGN PATENT DOCUMENTS

| | | |
|---|---|---|
| JP | Hei 8-227655 | 9/1996 |
| JP | 10-269933 | 10/1998 |
| JP | 2000-277003 | 10/2000 |
| KR | 2001-0056989 | 7/2001 |

OTHER PUBLICATIONS

Yahachi Saito, et al. "Conical Beams From Open Nanotubes," Nature, vol. 389, Oct. 9, 1997. pp. 554–555.
S. Uemura, et al. "Carbon Nanotube FED Elements," SID 98 Tech. Digest, 1998. pp. 1052–1055.
W.B. Choi, et al. "A 4.5-in. Fully Sealed Carbon Nanotube-Based Field-Emission Flat-Panel Display" SID 99 Tech. Digest, 1999. pp. 1134–1137.

* cited by examiner

*Primary Examiner*—Vip Patel
*Assistant Examiner*—Karabi Guharay
(74) *Attorney, Agent, or Firm*—Oblon, Spivak, McClelland, Maier & Neustadt, P.C.

(57) ABSTRACT

A field emission cold cathode device of a lateral type includes a cathode electrode and gate electrode disposed on a major surface of a support substrate laterally side by side. The cathode electrode and gate electrode have side surfaces which oppose each other, and an emitter is disposed on the opposite side surface of the cathode electrode. The emitter includes a metal plating layer formed on the cathode electrode, and a plurality of granular or rod-shaped micro-bodies. The micro-bodies are consisting essentially of a material selected from the group consisting of fullerenes, carbon nanotubes, graphite, a material with a low work function, a material with a negative electron affinity, and a metal material, and are supported in the metal plating layer in a dispersed state.

20 Claims, 4 Drawing Sheets

FIELD EMISSION COLD CATHODE DEVICE OF LATERAL TYPE

CROSS-REFERENCE TO RELATED APPLICATIONS

This application is based upon and claims the benefit of priority from the prior Japanese Patent Application No. 2000-351610, filed Nov. 17, 2000, the entire contents of which are incorporated herein by reference.

BACKGROUND OF THE INVENTION

1. Field of the Invention

The present invention relates to a field emission cold cathode device of a lateral type, a manufacturing method thereof, and a vacuum micro-device.

2. Description of the Related Art

In recent years, a field emission cold cathode device utilizing Si semiconductor processing techniques has been actively developed. As a typical example of such a device, a field emission cold cathode device of a vertical type described by C. A. Spindt et al in Journal of Applied Physics, Vol. 47, 5248 (1976) is known. This field emission cold cathode device has, on a Si single-crystalline substrate, a conical emitter and a gate electrode disposed to surround the distal end of the emitter.

A field emission cold cathode device of a lateral type (Tech. Digest of IEDM 85, p. 172 (1985)) proposed by R. Green, H. F. Gray et al in view of the problems of the field emission cold cathode device of a vertical type is also known. This field emission cold cathode device has an emitter and gate electrode disposed on one substrate to oppose each other. The field emission cold cathode device of a lateral type is advantageous in that it can be manufactured easily and provide a high yield.

According to the field emission cold cathode device of a lateral type, an emitter end face opposing the gate electrode has, in a direction perpendicular to the substrate surface, a sharpness of about 80 nm to 500 nm corresponding to the emitter thickness, and a sharpness of about 40 nm to 250 nm as the radius of curvature of the distal end. In a direction parallel to the substrate surface, however, this emitter end face is parallel to the gate electrode and has zero sharpness. In other words, the emitter end face opposing the gate electrode does not have a three-dimensional sharpness but only has a two-dimensional sharpness, and has a high driving voltage. This is the disadvantage of this device. When the emitter end face is to be sharpened three-dimensionally, a sharpness exceeding that of the lithography cannot be obtained. Thus, the sharpness usually stays at about 50 nm to 100 nm in a direction parallel to the substrate surface. When the number of precise lithography steps increases, the merit of simplifying the manufacturing method declines.

As a field emission cold cathode device, one using fullerenes or carbon nanotubes to form an emitter is proposed (for example, Jpn. Pat. Appln. KOKAI Publication No. 10-149760). Since the distal ends of the fullerenes or carbon nanotubes have a small radius of curvature, they can decrease the driving voltage and improve the field emission efficiency. Since the fullerenes and carbon nanotubes less depend on the atmosphere and are less influenced by the residual gas, they are expected to operate also at a low vacuum degree.

In the cold cathode device of this type, the emitter can be formed by dispersing fullerenes or carbon nanotubes in an organic solvent, passing the dispersion through a ceramic filter, and bonding the fullerenes or carbon nanotubes on the filter onto a substrate. The emitter can alternatively be formed by depositing fullerenes or carbon nanotubes on a substrate directly by CVD or the like. Furthermore, the emitter can also be formed by dispersing fullerenes or carbon nanotubes in a thick film paste, printing the paste, and sintering the paste at a high temperature (about 500° C. to 800° C.).

With the method of bonding or depositing fullerenes or carbon nanotubes onto a substrate, the emitter is adhered weakly, and is easily separated by a strong field applied to it. With the method of forming fullerenes or carbon nanotubes by printing, the performance may be decreased or degraded by causes such as high-temperature sintering. With both bonding and printing, the resulted carbon nanotubes are not oriented well to an extracting electrode, and the problems of an increase in driving voltage, nonuniform electron emission, and the like exist.

With the bonding method, since carbon has a high chemical resistance and is difficult to etch, it is very difficult to pattern carbon to correspond to the cathode interconnection. With the depositing method in accordance with CVD, a transition-metal catalyst is necessary, and must be very small. This increases the resistance of the interconnection, leading to signal delay or the like. With the printing method, the film has a high resistance, and it is difficult to form a thick film. Therefore, a low-resistance interconnection is difficult to form, and signal delay or the like also tends to occur.

In this manner, as the field emission cold cathode device, various types of devices are proposed, e.g., a lateral one aiming at improvement of the drawbacks of the vertical device, and one using carbon nanotubes or fullerenes to form the emitter. The conventionally proposed field emission cold cathode device is, however, not sufficient in terms of sharpness, driving voltage, reliability, yield, manufacturing easiness, and the like. Under these circumstances, in a field emission cold cathode device of a lateral type and a vacuum micro-device using it, a device structure and a manufacturing method that can achieve a low driving voltage, a high field emission efficiency, and a high integration degree are sought for.

BRIEF SUMMARY OF THE INVENTION

According to a first aspect of the invention, there is provided a field emission cold cathode device of a lateral type comprising:

a support substrate;

a cathode electrode disposed on the support substrate and having a first side surface;

a gate electrode disposed on the support substrate to be laterally side by side with the cathode electrode and having a second side surface opposing the first side surface; and an emitter disposed on the first side surface to oppose the second surface, the emitter comprising a metal plating layer formed on the first side surface and a plurality of granular or rod-shaped micro-bodies supported in the metal plating layer in a dispersed state, the micro-bodies consisting essentially of a material selected from the group consisting of fullerenes, carbon nanotubes, graphite, a material with a low work function, a material with a negative electron affinity, and a metal material.

According to a second aspect of the present invention, there is provided a vacuum micro-device comprising:
a support substrate;
a cathode electrode disposed on the support substrate and having a first side surface;
a gate electrode disposed on the support substrate laterally side by side with the cathode electrode and having a second side surface opposing the first side surface;
an emitter disposed on the first side surface to oppose the second surface, the emitter comprising a metal plating layer formed on the first side surface and a plurality of carbon nanotubes supported in the metal plating layer in a dispersed state;
a surrounding member cooperating with the support substrate to form a vacuum discharge space that surrounds the cathode electrode, the gate electrode, and the emitter; and
an anode electrode disposed on the surrounding member at a position opposite to the cathode electrode and the gate electrode.

According to a third aspect of the present invention, there is provided a method of manufacturing a device according to the first aspect, comprising:
forming an intermediate structure by disposing the cathode electrode and the gate electrode on the support substrate;
preparing a plating suspension by suspending the micro-bodies in a plating solution for the metal plating layer; and
forming the metal plating layer on the first side surface of the cathode electrode by dipping the intermediate structure in the plating suspension and subjecting the intermediate structure to a plating process, the metal plating layer comprising the micro-bodies dispersed therein.

DETAILED DESCRIPTION OF THE INVENTION

Figure 1:
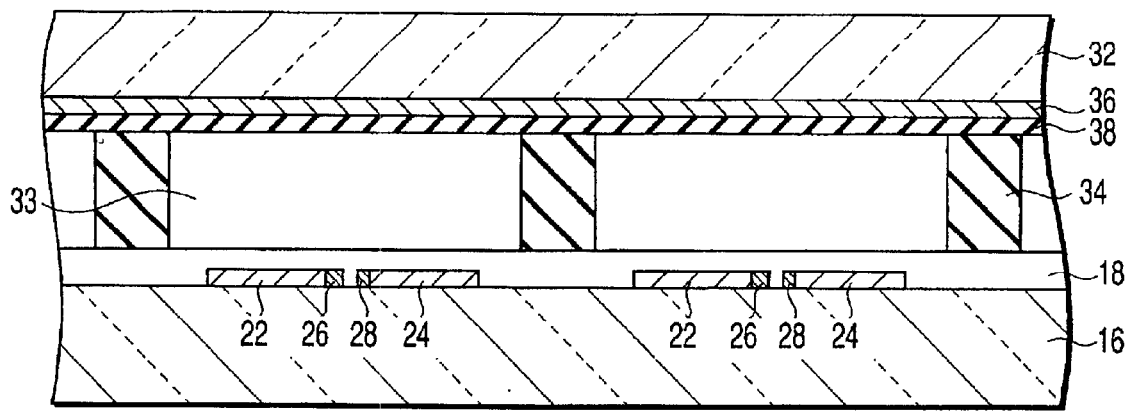
FIG. 1 is a sectional view showing a flat image display device as an example of a vacuum micro-device to which a field emission cold cathode device of a lateral type according to an embodiment of the present invention is applied.

The embodiments of the present invention will be described with reference to the accompanying drawings. In the following description, constituent elements having substantially the same function and arrangement are denoted by the same reference numerals, and a repetitive description will be made when necessary.

Figure 2:
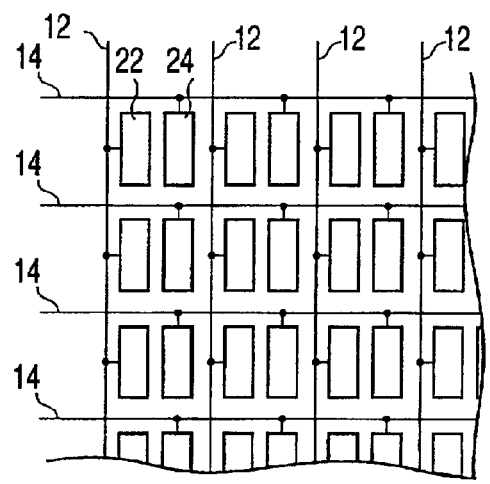
FIG. 2 is a partial plan view of the device shown in FIG. 1.

FIG. 1 is a sectional view showing a flat image display device as an example of a vacuum micro-device to which a field emission cold cathode device of a lateral type according to an embodiment of the present invention is applied. FIG. 2 is a partial plan view of this device, and FIG. 3 is a sectional view of the main part of this device.

As shown in FIG. 2, this display device has pairs of cathode electrodes 22 and gate electrodes 24 to respectively correspond to a large number of pixels arranged in a matrix. The cathode electrodes 22 are connected to cathode lines 12 running in the vertical direction in FIG. 2, and the gate electrodes 24 are connected to gate lines 14 running in the horizontal direction in FIG. 2.

Figure 3:
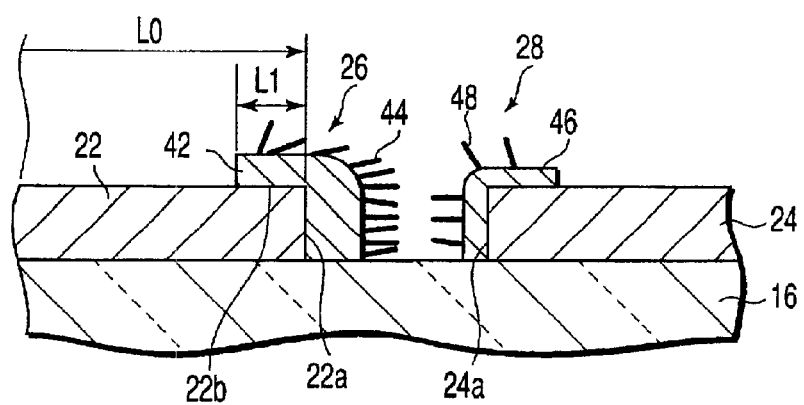
FIG. 3 is a sectional view of the main part of the device shown in FIG. 1.

All the cathode electrodes 22 and gate electrodes 24 are formed on the flat major surface (the upper surface expending in the horizontal direction in FIG. 1) of a glass-made insulating support substrate 16, as shown in FIGS. 1 and 3. In each pixel, a cathode electrode 22 and gate electrode 24 run laterally side by side at a small gap of 1 $\mu$m to 30 $\mu$m on the support substrate 16. An emitter 26 and gate projection 28 with structures to be described later in detail are disposed on those opposite side surfaces 22a and 24a of the cathode electrode 22 and gate electrode 24, which oppose each other. The cathode lines 12, gate lines 14, and the like are built in a wiring structure 18 formed on the support substrate 16.

A transparent opposite substrate 32 made of glass is disposed to oppose the glass-made support substrate 16, to form a vacuum discharge space 33 between them. The distance between the two substrates 16 and 32 is maintained by surrounding frames and spacers 34. A transparent common electrode, i.e., an anode electrode 36, and a fluorescent layer 38 are formed on that surface of the opposite substrate 32 which opposes the support substrate 16.

In this flat image display device, when the voltage between the gate electrode 24 and cathode electrode 22 of each pixel is arbitrarily set through the corresponding gate line 14 and cathode line 12, whether the pixel is to be turned on or off can be selected. More specifically, the pixels can be selected by so-called matrix driving of applying a predetermined potential as a selection signal to the cathode lines 12 in synchronism with sequentially selecting the gate lines 14 and applying a predetermined potential to them.

When certain one gate line 14 and certain one cathode line 12 are selected and predetermined potentials are applied to them, only the emitter 26 located at the intersection of the selected gate line 14 and cathode line 12 operates. Electrons emitted from the emitter 26 are attracted by the anode electrode 36 and the gate electrode 46, wherein electrons directed to the anode electrode 36 reach the fluorescent layer 38 at a position corresponding to the selected emitter 26, and cause the fluorescent layer 38 to emit light.

As shown in FIG. 3, each emitter 26 comprises a metal plating layer 42 and a plurality of granular or rod-shaped micro-bodies 44. The metal plating layer 42 is selectively formed in the vicinity of the opposite side surface 22a of the corresponding cathode electrode 22. The micro-bodies 44 are supported in the metal plating layer 42 in a dispersed state and made of a conductive material. In this embodiment, the metal plating layer 42 serves as a resistance ballast layer for improving the current emission stability and the planar uniform field emission properties. The micro-bodies 44 serve as a terminal for emitting electrons.

More specifically, the metal plating layer 42 is preferably formed to have a resistance ballast effect. Hence, the resistivity of the metal plating layer 42 is set to $10^{-8}$ Ωm to $10^{-4}$ Ωm, and preferably $10^{-7}$ Ωm to $10^{-4}$ Ωm. For this purpose, the metal plating layer 42 contains an additive material, e.g., B and P, or PTFE (polytetrafluoroethylene), for increasing its resistance. When a Ni—B—P-based Ni plating layer is used as the metal plating layer 42, the concentration of B is set to 3% to 40%, and that of P is set to 7% to 40%. When a PTFE-containing Ni plating layer is used as the metal plating layer 42, the concentration of PTFE is set to 0.1% to 30%.

The metal plating layer 42 is formed only on the opposite side surface 22a of the cathode electrode 22 or, in addition to there, on that portion 22b of the upper surface (surface opposing the anode electrode 36) of the cathode electrodes 22 which is in the vicinity of the opposite side surface 22a, as shown in FIG. 3. In this case, a length L1 (see FIG. 3) of the additional portion 22b is set to be 25% or less a length L0 of the entire upper surface of the cathode electrode 22. This is because since only the gate electrode 24 and its vicinity can substantially serve as the emitter, no effect is obtained by further extending the metal plating layer 42.

Figure 4A:
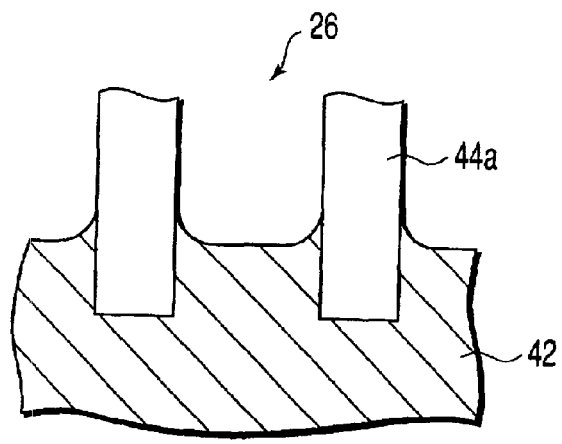
FIG. 4A is an enlarged view showing the relationship between rod-shaped micro-bodies such as carbon nanotubes and a metal plating layer.
Figure 4B:
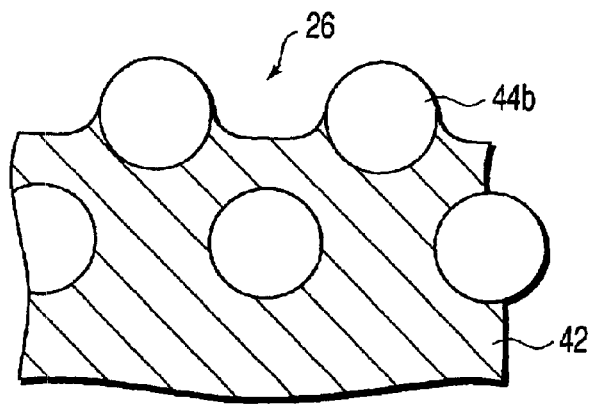
FIG. 4B is an enlarged view showing the relationship between granular micro-bodies such as fullerenes and a metal plating layer.

The micro-bodies 44 are made of rod-shaped bodies such as carbon nanotubes (in FIG. 3, the micro-bodies 44 are rod-shaped bodies), or of granular bodies such as fullerenes. FIG. 4A shows a case wherein the micro-bodies 44 are rod-shaped bodies 44a such as carbon nanotubes. In this case, most of the rod-shaped bodies 44a are fixed as their bases are buried in the metal plating layer 42, while their upper portions are exposed to the surface of the emitters 26. Alternatively, the rod-shaped bodies 44a are entirely covered thin with the metal plating layer 42, and projections accordingly appear on the surface of the emitter 26. FIG. 4B shows a case wherein the micro-bodies 44 are granular bodies 44b such as fullerenes. In this case, the granular bodies 44b are fixed as they are buried in the metal plating layer 42 such that they are partly exposed. Alternatively, the granular bodies 44b are entirely covered thin with the metal plating layer 42 and projections accordingly appear on the surface of the emitter 26.

As the granular or rod-shaped micro-bodies 44 improve the electron emission characteristics of the emitter 26, they must have a small radius or radius of curvature. More specifically, when the micro-bodies 44 are granular bodies, their radius is set to 100 nm or less, and preferably 30 nm or less. When the micro-bodies 44 are rod-shaped bodies, the radius of curvature of their distal ends is set to 50 nm or less, and preferably 15 nm or less.

When the micro-bodies 44 are made of rod-shaped bodies such as carbon nanotubes, to improve the electron emission characteristics, they are preferably oriented toward the gate electrode 24. More specifically, 50% to 100% of rod-shaped micro-bodies 44 are preferably oriented within an angular range of ±20° relative to the direction of the flat major surface of the support substrate 16 (the horizontal direction in FIGS. 1 and 3).

This orientation of the rod-shaped micro-bodies 44 can be achieved by forming an electric field between the cathode electrode 22 and gate electrode 24 when a plating process is performed by using a plating suspension of micro-bodies 44, as will be described later. More specifically, in the plating process, when a positive potential is applied to the gate electrode 24 with respect to the cathode electrode 22, the conductive micro-bodies 44 are oriented mainly along the electric force line of the electric field between the cathode electrode 22 and gate electrode 24.

If the rod-shaped micro-bodies 44 are long ones that bridge the cathode electrode 22 and gate electrode 24, the two electrodes 22 and 24 are short-circuited. When, for example, the distance between the two electrodes 22 and 24 is 1 μm to 30 μm, rod-shaped micro-bodies 44 shorter than this distance is preferably used. Hence, when preparing the plating suspension, the micro-bodies 44 that are classified in accordance with a predetermined length can be used. However, as will be described later, even after the micro-bodies 44 are disposed, a gap can be formed between the emitter 26 and gate projection 28. Therefore, the length of the micro-bodies 44 before formation is not a limiting one.

Figure 5:
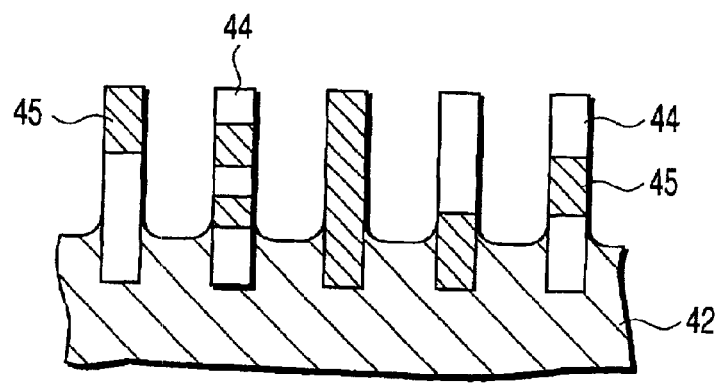
FIG. 5 is an enlarged view showing the relationship between hollow rod-shaped micro-bodies and a filler layer.

Although the micro-bodies 44 are preferably made of carbon nanotubes or fullerenes, they can also be made of other materials. As the other materials to form the micro-bodies 44, graphite, a material with a low work function, a material with a negative electron affinity (NEA), a metal material, or the like can be used. More specifically, $LaB_6$, AlN, GaN, Mo, Ta, W, Ni, Cr, Au, Ag, Pd, Cu, Al, Sn, Pt, Ti, Fe, carbon, graphite, diamond, Si, TiN, TiC, beta W, SiC, $Al_2O_3$, ZnO and particularly tetrapod-shaped ZnO having sharp pods, aluminum borate ($9Al_2O_3 \cdot 2B_2O_3$) and particularly filler-type aluminum borate, potassium titanate, and the like can be used. When the micro-bodies 44 are hollow, a filler layer 45 made of a conductive material can be formed in micro-bodies 44, as shown in FIG. 5.

The carbon nanotubes and fullerenes described above are both allotropes of carbon, and are basically of the same nature. A singular-shaped extremely long fullerene forms a carbon nanotube. The basic type of fullerene is $C_{60}$ formed of 6- and 5-membered carbon rings and has a diameter of about 0.7 nm. The structure of $C_{60}$ is as follows. Twelve vertices of a regular icosahedron which form pentagonal prisms are all truncated to form a truncated icosahedron (consequently a dotriacontahedron). All vertices of the icosahedron are occupied by carbon atoms with $sp^2$ hybrid orbitals. Other than $C_{60}$, a practically infinite number of high-order fullerenes with carbon numbers exceeding 60, e.g., $C_{70}$, $C_{76}$, $C_{82}$, $C_{84}$, $C_{90}$, $C_{96}$, ..., $C_{240}$, $C_{540}$, $C_{720}$, and the like exist.

As fullerenes are hollow, an onion-like fullerene in which many layers of low-order fullerenes fill a high-order fullerene like an onion exists. Such a fullerene is called a super fullerene. The layer-to-layer distance of the super fullerene is 0.341 nm. For example, a fullerene in which $C_{240}$ fills $C_{540}$ and $C_{60}$ further fills $C_{240}$ is expressed as $C_{60}@C_{240}@C_{540}$. The symbol @ indicates that a fullerene with this symbol is a nested fullerene which nests a molecule or atom described before this symbol therein.

A fullerene can nest a metal in its hollow portion. An example of such a metal-nested fullerene includes $La@C_{60}$, $La@C_{76}$, $La@C_{84}$, $La_2@C_{80}$, $Y_2@C_{84}$, $Sc_3@C_{82}$, and the like. A heterofullerene in which an element other than carbon, e.g., N, B, or Si, is incorporated in the skeleton of a fullerene has also been studied.

A fullerene can be prepared by gasifying carbon by subjecting graphite to laser radiation, arc discharge, resistance heating, or the like, causing cooling, reaction, and cohesion of gasified carbon while passing it through helium gas, and collecting it with a collecting member.

The gate projection 28 opposing the emitter 26 has a metal plating layer 46 and a plurality of granular or rod-shaped micro-bodies 48. The metal plating layer 46 is selectively formed on the opposite side surface 24a of the gate electrode 24. The micro-bodies 48 are supported in the metal plating layer 46 in a dispersed state and made of a conductive material. The metal plating layer 46 and micro-bodies 48 of the gate projection 28 are made of the same materials as those of the metal plating layer 42 and micro-bodies 44, respectively, of the emitter 26. During the plating process of forming the emitter 26 and gate projection 28, assume that a positive potential is applied to the gate electrode 24 with respect to the cathode electrode 22. Then, the thickness of the metal plating layer 46 and the concentration of the micro-bodies 48 in the gate projection 28 become smaller than the thickness of the metal plating layer 42 and the concentration of the micro-bodies 44, respectively, in the emitter 26.

In the field emission cold cathode device of a lateral type according to this embodiment, the micro-bodies 44 of the emitter 26 are supported by the cathode electrode 22 through the metal plating layer 42. Therefore, the micro-bodies 44 are firmly fixed to the cathode electrode 22. An emitter with a high adhesion strength that can endure even a strong field can be obtained, and the stability of field emission can be improved.

The metal plating layer 42 of the emitter 26 preferably contains an impurity for obtaining a so-called resistance ballast effect. For example, as the metal plating layer 42, a Ni—B—P-based plating layer or PTFE-containing Ni plating layer with a resistance higher than that of a Ni plating layer is used. Thus, a potential drop is caused by the metal plating layer 42. Even if the radii of curvature or shapes of the distal ends of the respective emitters 26 differ, the field strengths of the distal ends of the emitters are substantially decreased by the resistance ballast effect. The instability and nonuniformity of field emission are thus improved greatly. Regarding this, in the conventional device, if the radii of curvature or shapes of the distal ends of the respective emitters 26 differ, the field strength distributions differ. Accordingly, the nonuniformity of the field emission characteristics becomes conspicuous.

Figure 6A:
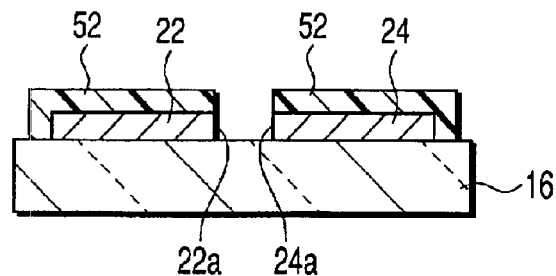
FIGS. 6A to 6C are views showing a method of manufacturing a field emission cold cathode device of a lateral type according to another embodiment of the present invention in the order of steps.
Figure 6B:
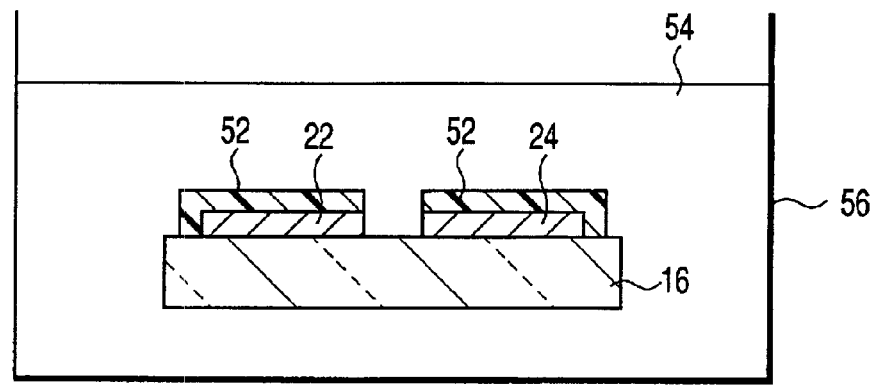
Figure 6C:
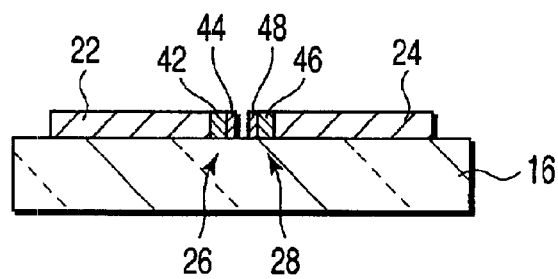

FIGS. 6A to 6C are views showing a method of manufacturing a field emission cold cathode device of a lateral type according to another embodiment of the present invention in the order of steps. This device is applicable to the device shown in FIG. 1.

First, a metal cathode electrode 22 and metal gate electrode 24 were formed on a support substrate 16 made of glass. The cathode electrode 22 and gate electrode 24 were formed each with a highly conductive Ni plating film having a thickness of 2 $\mu$m by considering signal delay in a large field emission display. The gap between the cathode electrode 22 and gate electrode 24 was formed by lithography with an exposure apparatus such as a stepper.

The cathode electrode 22 and gate electrode 24 were covered with plating resist films 52, respectively, to expose only their side surfaces 22a and 24a that oppose each other (FIG. 6A). Alternatively, the plating resist films 52 can be formed to additionally expose the upper surface portions of the two electrodes 22 and 24 in the vicinities of the opposite side surfaces 22a and 24a. In this case, a length L1 (see FIG. 3) of an additional portion 22b is set to be 25% or less a length L0 of the entire upper surface of the cathode electrode 22. Alternatively, the plating resist films 52 can be formed to expose only the opposite side surface 22a of the cathode electrode 22 which forms an emitter 26.

25 g of nickel sulfate, 40 g of sodium phosphinic acid, 10 g of sodium acetate, 10 g of sodium citric acid, and 30 g of boric acid were dissolved in 1 litter of distilled water. An electroless Ni—B—P-based resistance plating solution adjusted to about PH 5 for metal plating layers 42 and 46 was thus formed. About 50 g of fullerene $C_{60}$ or carbon nanotubes classified to a predetermined length and for forming micro-bodies 44 were mixed in this plating solution. This plating solution was then suspended in a plating tank 56 by agitation, thus preparing a plating suspension 54. The temperature of the plating suspension 54 was then maintained at about 80° C. In this state, the support substrate 16, on which the cathode electrode 22, gate electrode 24, and plating resist films 52 were disposed in the above manner, was dipped in the plating suspension 54. An electroless plating process was performed (FIG. 6B).

The electroless plating process was performed for about 3 minutes. Ni—B—P-based electroless resistance plating layers (metal plating layers 42 and 46) having a thickness of about 3 $\mu$m were formed on the opposite side surfaces 22a and 24a of the exposed cathode electrode 22 and gate electrode 24. During this plating process, the fullerenes or carbon nanotubes for forming the micro-bodies 44 precipitated together with the plating material. Thus, the metal plating layers 42 and 46 were formed with the micro-bodies 44 being buried in them in a dispersed state.

More specifically, with the above electroless plating process, the emitter 26 and a gate projection 28 were formed on the opposite side surfaces 22a and 24a of the cathode electrode 22 and gate electrode 24, respectively. The emitter comprised the metal plating layer 42 and micro-bodies 44. The gate projection 28 comprised the metal plating layer 46 and micro-bodies 48. On the glass-made support substrate 16 between the cathode electrode 22 and gate electrode 24, adhesion of the metal plating layer was weak. At this portion, a metal plating layer was not substantially formed, or even if it was, it was easily separated by an ultrasonic wave. Therefore, after washing with water and drying, a field emission cold cathode device of a lateral type with a predetermined structure applicable to the device shown in FIG. 1 could be obtained (FIG. 6C).

In this case, the electroless plating process was performed. Thus, the thickness of the metal plating layer 42 and the concentration of the micro-bodies 44 in the emitter 26 became substantially equal to the thickness of the metal plating layer 46 and the concentration of the micro-bodies 48, respectively, in the gate projection 28.

The field emission characteristics of the field emission cold cathode device manufactured in accordance with the method shown in FIGS. 6A to 6C were measured. Even when a strong field of as high as $10^7$ V/cm or more was applied to the distal end of the emitter 26, the emitter 26 remained firmly adhered to the cathode electrode 22 and did not separate. The emitter 26 thus showed stable field emission characteristics. On the other hand, an emitter was formed without no metal plating layer 42 but with only fullerenes of carbon nanotubes. When such a strong field was applied to the emitter, an emitter separating phenomenon was observed, and only unstable field emission characteristics were obtained.

In the device of this embodiment, also partly because of the resistance ballast effect of the Ni—B—P-based metal plating layer 42, the current emission stability improved by 2% to 30%. The planar uniform field emission properties also improved. When compared to a Mo emitter fabricated by spin deposition, the radius of curvature of the distal end of the emitter was greatly decreased. More specifically, the radius of curvature was decreased from a range of about 70 nm to 300 nm to a range of about 1 nm to 30 nm. Hence, the driving voltage also was greatly decreased from about 100V to about 7V. When the vacuum degree decreased from about $10^{-9}$ Torr to about $10^{-7}$ Torr, in the Mo emitter fabricated by spin deposition, the emission current decreased to about 1/10 or less and current fluctuation increased by several hundred % or more, while they did not substantially change in the device of this embodiment.

Figure 7A:
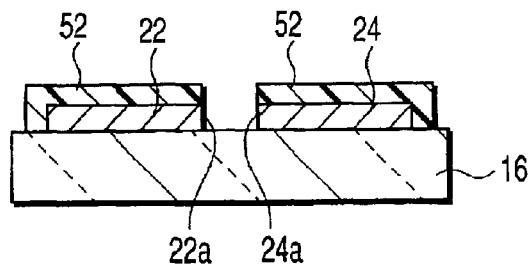
FIGS. 7A to 7C are views showing a method of manufacturing a field emission cold cathode device of a lateral type according to still another embodiment of the present invention in the order of steps.
Figure 7B:
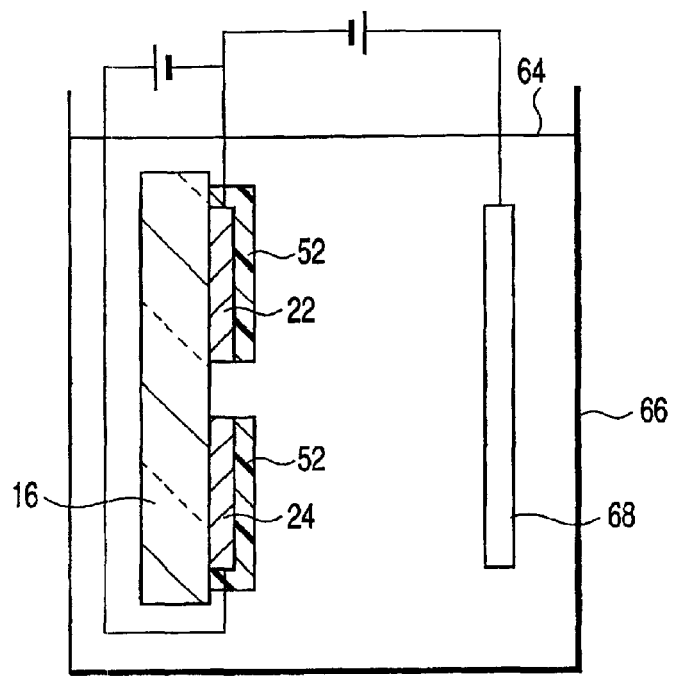
Figure 7C:
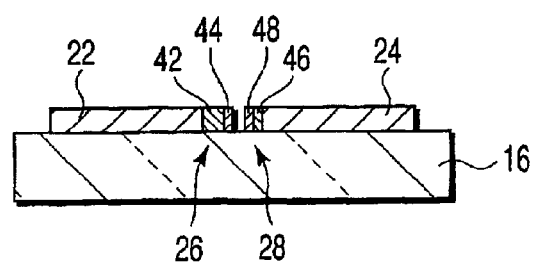

FIGS. 7A to 7C are views showing a method of manufacturing a field emission cold cathode device of a lateral type according to still another embodiment of the present invention in the order of steps. This device is also applicable to the device shown in FIG. 1.

First, a metal cathode electrode 22 and metal gate electrode 24 were formed on a support substrate 16 made of glass in the same manner as in the embodiment shown in FIGS. 6A to 6C. The cathode electrode 22 and gate electrode 24 having a thickness of 1 μm were formed each with a highly conductive Ni plating film by considering signal delay in a large field emission display. The cathode electrode 22 and gate electrode 24 were covered with plating resist films 52, respectively, to expose only their opposite side surfaces 22a and 24a that oppose each other (FIG. 7A). The range of the two electrodes 22 and 24 that are to be covered with the plating resist films 52 can be changed as described above.

600 g of nickel sulfamine acid, 5 g of nickel chloride, 30 g of sodium phosphinic acid, 40 g of boric acid, and 1 g of succharin were dissolved in 1 litter of distilled water. A resistance plating solution adjusted to about PH 4 for metal plating layers 42 and 46 was thus formed. About 40 g of carbon nanotubes for forming micro-bodies 44 were mixed in this plating solution. This plating solution was then suspended in a plating tank 66 by agitation, thus preparing a plating suspension 64. The temperature of the plating suspension 64 was then maintained at about 50° C. In this state, the support substrate 16, on which the cathode electrode 22, gate electrode 24, and plating resist films 52 were disposed in the above manner, was dipped in the plating suspension 64. An electroplating process was performed (FIG. 7B). The voltages were set such that 100V, 10V, and 0V were applied to an anode 68, the gate electrode 24, and the cathode electrode 22, respectively.

The electroplating process was performed for about 4 minutes. Ni—B—P-based resistance plating layers (metal plating layers 42 and 46) having thicknesses of about 4 μm and 0.5 μm, respectively, were formed on the opposite side surfaces 22a and 24a of the exposed cathode electrode 22 and gate electrode 24. During this plating process, the fullerenes or carbon nanotubes for forming the micro-bodies 44 precipitated together with the plating material. Thus, the metal plating layers 42 and 46 were formed with the micro-bodies 44 being buried in them in a dispersed state.

More specifically, with the above electroplating process, an emitter 26 and gate projection 28 were formed on the opposite side surfaces 22a and 24a of the cathode electrode 22 and gate electrode 24, respectively. The emitter 26 comprised the metal plating layer 42 and micro-bodies 44. The gate projection 28 comprised the metal plating layer 46 and micro-bodies 48. On the glass-made support substrate 16 between the cathode electrode 22 and gate electrode 24, adhesion of the metal plating layer was weak. At this portion, a metal plating layer was not substantially formed, or even if it was, it was easily separated by an ultrasonic wave. Therefore, after washing with water and drying, a field emission cold cathode device of a lateral type with a predetermined structure applicable to the device shown in FIG. 1 could be obtained (FIG. 7C).

In this case, the electroplating process was performed with a positive potential being applied to the gate electrode 24 with respect to the cathode electrode 22. Thus, the thickness of the metal plating layer 46 and the concentration of the micro-bodies 48 in the gate projection 28 became smaller than the thickness of the metal plating layer 42 and the concentration of the micro-bodies 44, respectively, in the emitter 26. The carbon nanotubes were distributed mainly along the electric force line of the electric field between the cathode electrode 22 and gate electrode 24. More specifically, the proportion of the nanotubes oriented within an angular range of ±20° relative to the direction of the flat major surface of the support substrate 16 (the horizontal direction in FIGS. 1 and 3) was set to 50% to 100%. This proportion could be changed (accordingly, the electron emission characteristics could be changed) by adjusting the condition for the electroplating process.

The field emission characteristics of the field emission cold cathode device manufactured in accordance with the method shown in FIGS. 7A to 7C were measured. Even when a strong field of as high as $10^7$ V/cm or more was applied to the distal end of the emitter 26, the emitter 26 firmly adhered to the cathode electrode 22 and did not separate. The emitter 26 thus showed stable field emission characteristics.

In the device of this embodiment, also partly because of the highly oriented carbon nanotubes and the resistance ballast effect of the Ni—B—P-based metal plating layer 42, the current emission stability improved by 4% to 50%. The planar uniform field emission properties were also improved. When compared to a case wherein the carbon nanotubes were not oriented, the driving voltage was also improved by about 3%. This is probably because the orientation properties of the carbon nanotubes improved. In the same manner as in the embodiment shown in FIGS. 6A to 6C, this device was resistant against a high vacuum degree, and the emission current and current fluctuation substantially did not change.

In the embodiments shown in FIGS. 6A to 6C and FIGS. 7A to 7C, the fullerenes or carbon nanotubes are dispersed in the plating solution, and the plating process is performed. The fullerenes or the like precipitate and come into contact with the surface of the cathode electrode 22, and simultaneously the metal plating layer 42 is formed. Therefore, the metal plating layer 42 is firmly fixed to the cathode electrode 22, and the fullerenes or the like are firmly fixed to the metal plating layer 42. A high-adhesion emitter 26 that can endure even a strong field was obtained, thus improving the stability of electron emission. Since the plating process is performed at a low temperature of about 100° C. or less, the emitter 26 can be fabricated with less damage. If the cathode electrode 22 and the like are formed on the support substrate 16 in advance, the metal plating layer 42 can be selectively formed on the cathode electrode 22, thus simplifying the process.

In the embodiments shown in FIGS. 6A to 6C and FIGS. 7A to 7C, the lengths of the carbon nanotubes or the diameters of the fullerenes, and the thicknesses of the metal plating layers 42 and 46 to be deposited are adjusted in advance. This is to prevent the emitter 26 and gate projection 28 from being short-circuited by contact. Even when the emitter 26 and gate projection 28 are short-circuited by contact, they can be cut apart to form a gap between them by supplying power across the cathode electrode 22 and gate electrode 24. With this method, by appropriately adjusting the energization time, current amount, and the like, a shorter gap can be formed between the gate and emitter than in a case employing ordinary lithography.

Alternatively, in the embodiments shown in FIGS. 6A to 6C and FIGS. 7A to 7C, the micro-bodies 44 and 48 may be respectively entirely covered thin with the metal plating layers 42 and 46. Then, the surface of the micro-bodies 44 and 48 may be partly exposed by using one or a combination of wet etching, RIE, CDE, sputtering, and sublimation. In the embodiments shown in FIGS. 6A to 6C and FIGS. 7A to 7C, the Ni—B—P-based metal plating layer is used as the metal plating layer 42 of the emitter with the resistance ballast effect. Alternatively, a PTFE-containing Ni plating layer may be used. In this case, the PTFE-containing Ni plating layer can be formed by suspending PTFE in a Ni plating solution. As the matrix metal of the metal plating layer, other metals, e.g., Cr, Cu, and the like may be used.

The field emission cold cathode device of a lateral type according to the present invention can be used in a vacuum micropower device, an atmosphere-resistant device (a space device, a nuclear device, an ultimate-atmosphere-resistant device (radiation-resistant device, high-temperature-resistant device, and low-temperature-resistant device)), various types of sensors, and the like, in addition to the applications described above.

According to the present invention, since a plurality of granular or rod-shaped micro-bodies made of a conductive material can be fixed firmly with a metal plating layer, the adhesion strength of the emitter increases. Thus, a high-performance field emission cold cathode device of a lateral type which is excellent in stability and uniformity of field emission can be obtained.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A field emission cold cathode device of a lateral type comprising:

a support substrate;

a cathode electrode disposed on the support substrate and having a first side surface;

a gate electrode disposed on the support substrate laterally side by side with the cathode electrode and having a second side surface opposing the first side surface; and an emitter disposed on the first side surface to oppose the second surface, the emitter comprising a metal plating layer formed on the first side surface and a plurality of granular or rod-shaped micro-bodies supported in the metal plating layer in a dispersed state, the micro-bodies consisting essentially of a material selected from the group consisting of fullerenes, carbon nanotubes, graphite, a material with a low work function, a material with a negative electron affinity, and a metal materials, wherein the micro-bodies are partly buried in the metal plating layer.

2. The device according to claim 1, wherein the metal plating layer comprises a resistance ballast layer containing an additive material, which increases a resistance of the metal plating layer.

3. The device according to claim 2, wherein the metal plating layer has a resistivity of $10^{-8}$ Ωm to $10^{-4}$ Ωm.

4. The device according to claim 1, wherein the micro-bodies are granular bodies and have a radius of not more than 100 nm.

5. The device according to claim 1, wherein the micro-bodies are rod-shaped bodies and have distal ends with a radius of curvature of not more than 50 nm.

6. The device according to claim 1, wherein the micro-bodies are rod-shaped bodies, and 50% to 100% of the micro-bodies are oriented within an angular range of ±20° relative to a major surface of the support substrate, where the cathode electrode is disposed.

7. The device according to claim 1, wherein the micro-bodies are rod-shaped and hollow bodies, and a filler layer consisting essentially of a conductive material is disposed in the micro-bodies.

8. The device according to claim 1, further comprising a gate projection disposed on the second side surface to oppose the first side surface, the gate projection comprising a gate metal plating layer consisting essentially of the same material as that of the metal plating layer, and a plurality of gate micro-bodies supported in the gate metal plating layer in a dispersed state and consisting essentially of the same material as that of the micro-bodies.

9. The device according to claim 1, further comprising a surrounding member cooperating with the support substrate to form a vacuum discharge space that surrounds the cathode electrode, the gate electrode, and the emitter, and an anode electrode disposed on the surrounding member at a position opposing the cathode electrode and the gate electrode.

10. A vacuum micro-device comprising:

a support substrate;

a cathode electrode disposed on the support substrate and having a first side surface;

a gate electrode disposed on the support substrate laterally side by side with the cathode electrode and having a second side surface opposing the first side surface;

an emitter disposed on the first side surface to oppose the second surface, the emitter comprising a metal plating layer formed on the first side surface and a plurality of carbon nanotubes supported in the metal plating layer in a dispersed state, the carbon nanotubes being partly buried in the metal plating layer;

a surrounding member cooperating with the support substrate to form a vacuum discharge space that surrounds the cathode electrode, the gate electrode, and the emitter; and an anode electrode disposed on the surrounding member at a position opposing the cathode electrode and the gate electrode.

11. The device according to claim 10, wherein the surrounding member comprises a transparent opposite substrate opposing the support substrate, and the anode electrode comprises a transparent electrode and a fluorescent layer disposed on the opposite substrate in the vacuum discharge space.

12. The device according to claim 10, wherein the metal plating layer comprises a resistance ballast layer containing an additive material, which increases a resistance of the metal plating layer.

13. The device according to claim 12, wherein the metal plating layer has a resistivity of $10^{-8}$ Ωm to $10^{-4}$ Ωm.

14. The device according to claim 10, wherein 50% to 100% of the carbon nanotubes are oriented within an angular range of ±20° relative to a major surface of the support substrate, where the cathode electrode is disposed.

15. The device according to claim 10, further comprising a gate projection disposed on the second side surface to oppose the first side surface, the gate projection comprising a gate metal plating layer consisting essentially of the same material as that of the metal plating layer, and a plurality of carbon nanotubes supported in the gate metal plating layer in a dispersed state.

16. A field emission cold cathode device of a lateral type comprising:

a support substrate;

a cathode electrode disposed on the support substrate and having a first side surface;

a gate electrode disposed on the support substrate laterally side by side with the cathode electrode and having a second side surface opposing the first side surface; and an emitter disposed on the first side surface to oppose the second surface, the emitter comprising a metal plating layer formed on the first side surface and a plurality of granular or rod-shaped micro-bodies supported in the metal plating layer in a dispersed state, the micro-bodies consisting essentially of a material selected from the group consisting of fullerenes, carbon nanotubes, graphite, a material with a low work function, a material with a negative electron affinity, and a metal material, wherein the metal plating layer comprises a resistance ballast layer containing an additive material, which increases a resistance of the metal plating layer, and wherein the metal plating layer has a resistivity of $10^{-8}$ $\Omega$m to $10^{-4}$ $\Omega$m.

17. A field emission cold cathode device of a lateral type comprising:

a support substrate;

a cathode electrode disposed on the support substrate and having a first side surface;

a gate electrode disposed on the support substrate laterally side by side with the cathode electrode and having a second side surface opposing the first side surface; and an emitter disposed on the first side surface to oppose the second surface, the emitter comprising a metal plating layer formed on the first side surface and a plurality of granular or rod-shaped micro-bodies supported in the metal plating layer in a dispersed state, the micro-bodies consisting essentially of a material selected from the group consisting of fullerenes, carbon nanotubes, graphite, a material with a low work function, a material with a negative electron affinity, and a metal material, wherein the micro-bodies are entirely buried in the metal plating layer.

18. A field emission cold cathode device of a lateral type comprising:

a support substrate;

a cathode electrode disposed on the support substrate and having a first side surface;

a gate electrode disposed on the support substrate laterally side by side with the cathode electrode and having a second side surface opposing the first side surface; and an emitter disposed on the first side surface to oppose the second surface, the emitter comprising a metal plating layer formed on the first side surface and a plurality of granular or rod-shaped micro-bodies supported in the metal plating layer in a dispersed state, the micro-bodies consisting essentially of a material selected from the group consisting of fullerenes, carbon nanotubes, graphite, a material with a low work function, a material with a negative electron affinity, and a metal material, wherein the micro-bodies are rod-shaped bodies, and 50% to 100% of the micro-bodies are oriented within an angular range of ±20° relative to a major surface of the support substrate, where the cathode electrode is disposed.

19. A field emission cold cathode device of a lateral type comprising:

a support substrate;

a cathode electrode disposed on the support substrate and having a first side surface;

a gate electrode disposed on the support substrate laterally side by side with the cathode electrode and having a second side surface opposing the first side surface; and an emitter disposed on the first side surface to oppose the second surface, the emitter comprising a metal plating layer formed on the first side surface and a plurality of granular or rod-shaped micro-bodies supported in the metal plating layer in a dispersed state, the micro-bodies consisting essentially of a material selected from the group consisting of fullerenes, carbon nanotubes, graphite, a material with a low work function, a material with a negative electron affinity, and a metal material, wherein the micro-bodies are rod-shaped and hollow bodies, and a filler layer consisting essentially of a conductive material is disposed in the micro-bodies.

20. A field emission cold cathode device of a lateral type comprising:

a support substrate;

a cathode electrode disposed on the support substrate and having a first side surface;

a gate electrode disposed on the support substrate laterally side by side with the cathode electrode and having a second side surface opposing the first side surface;

an emitter disposed on the first side surface to oppose the second surface, the emitter comprising a metal plating layer formed on the first side surface and a plurality of granular or rod-shaped micro-bodies supported in the metal plating layer in a dispersed state, the micro-bodies consisting essentially of a material selected from the group consisting of fullerenes, carbon nanotubes, graphite, a material with a low work function, a material with a negative electron affinity, and a metal material; and a gate projection disposed on the second side surface to oppose the first side surface, the gate projection comprising a gate metal plating layer consisting essentially of the same material as that of the metal plating layer, and a plurality of gate micro-bodies supported in the gate metal plating layer in a dispersed state and consisting essentially of the same material as that of the micro-bodies.

* * * * *